(12) United States Patent
Kouchi et al.

(10) Patent No.: US 7,281,831 B2
(45) Date of Patent: Oct. 16, 2007

(54) DIRECTION INDICATORS FOR VEHICLES

(75) Inventors: Kaoru Kouchi, Kakogawa (JP);
Motoaki Kanou, Himeji (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 11/059,231

(22) Filed: Feb. 16, 2005

(65) Prior Publication Data

US 2005/0185415 A1    Aug. 25, 2005

(30) Foreign Application Priority Data

Feb. 20, 2004    (JP)    ............................. 2004-044403

(51) Int. Cl.
*B60Q 1/26*    (2006.01)

(52) U.S. Cl. ...................... 362/540; 362/514; 362/473

(58) Field of Classification Search ................ 362/540, 362/546, 514, 516, 547, 542, 800, 498, 298, 362/473
See application file for complete search history.

(56) References Cited

U.S. PATENT DOCUMENTS 4,720,652 A * 1/1988 DuBois, Jr. ................... 313/25
5,014,165 A * 5/1991 Naganawa .................. 362/520
6,471,380 B1 * 10/2002 Henneboehle et al. ...... 362/498
6,840,661 B2 * 1/2005 Desjardins .................. 362/545
6,932,497 B1 * 8/2005 Huang ........................ 362/494
2005/0128761 A1 * 6/2005 Wu ............................ 362/498

FOREIGN PATENT DOCUMENTS

JP    61-020472    1/1986

* cited by examiner

*Primary Examiner*—Ali Alavi

(57) ABSTRACT

To provide a direction indicator of a compact design effective to secure brightness and visibility during the blinking operation of the direction indicator, the direction indicator (9 or 11) includes an indicator body (92) adapted to be mounted on a vehicle body structure (FR), a lens member (93) mounted on the indicator body (92), a light emitter (12) and a reflector (13) positioned inwardly of the lens member (93), the reflector (13) reflecting an illuminating light, emitted from the light emitter (12), towards an intended area. A plane of joint (92*b*, 93*b*) between the indicator body (92) and the lens member (93) is inclined relative to a widthwise direction of the vehicle body structure (FR), and the lens member (93) has a laterally outer vertex portion (93*a*) protruding laterally outwardly from a position of a laterally outer vertex portion (92*a*) of the indicator body (92).

17 Claims, 6 Drawing Sheets

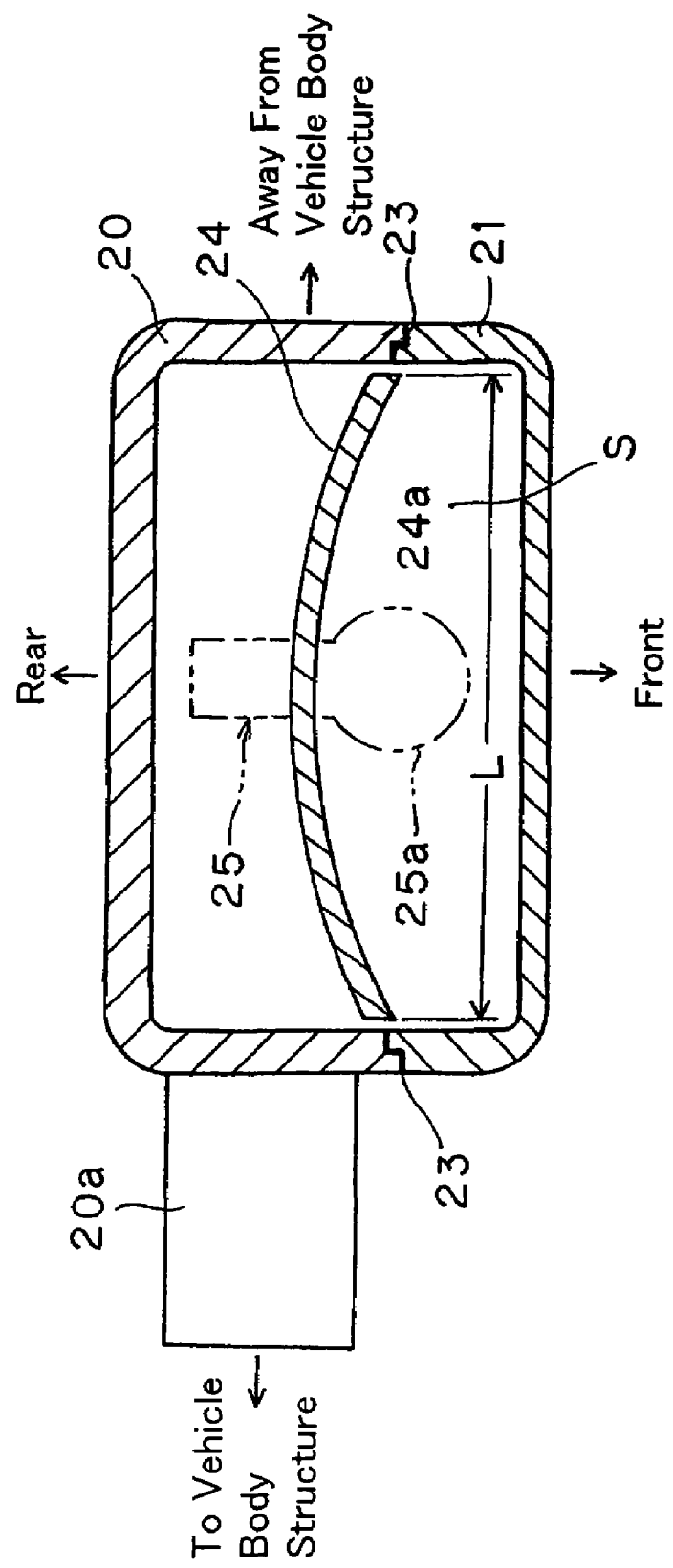

DIRECTION INDICATORS FOR VEHICLES

BACKGROUND OF THE INVENTION

1. Field of the Invention

The present invention generally relates to a direction indicator (a turn signal lamp) for vehicles and, more particularly, to a compact direction indicator of a type effective to secure brightness and visibility during the blinking operation of the direction indicator.

2. Description of the Prior Art

In general, the conventional direction indicator used in vehicles, particularly in motorcycles includes, as shown in a schematic plan view of the front direction indicator in FIG. 6, a generally cup-shaped indicator body 20 opening forwardly of the vehicle and having a support arm 20a supported by the vehicle body structure, and a lens member 21 mounted on the indicator body 20 so as to cover the front opening of the indicator body 20. Within the interior of the direction indicator delimited between the indicator body 20 and the lens member 21, a reflector 24 is disposed as shown in FIG. 7, having a reflecting surface 24a positioned inwardly from the plane of the joint 23 between the indicator body 20 and the lens member 21 so as to be oriented forwards. A lamp 25 having a stem portion and a light emitting bulb 25a is accommodated inside the direction indicator so as to lie in a direction parallel to the longitudinal sense of the vehicle body structure. In this condition, the light emitting bulb 25a of the lamp 25 is positioned within an inner space S that is delimited between the reflector 24 and the lens member 21, while the stem portion of the lamp 25 is positioned rearwardly of the reflector 24 and within the indicator body 20. See, for example, the Japanese Patent Publication No. 61-20472 published in 1986.

It has, however, been found that in the direction indicator of the structure discussed above, the reflector 24 and the lamp 25 are supported so as to be oriented forwards, and the illuminating angle in which rays of light emitted from the lamp 25 are reflected by the reflector 24 is limited mainly to a region forwardly of the vehicle. Also, the appearance of the indicator body 20 combined with the lens member 21 represents, as shown in FIG. 6, a generally rectangular box-like configuration having a relatively large width in a direction substantially perpendicular to the longitudinal sense of the vehicle body structure and, hence, the conventional direction indicator of the kind now under discussion is relatively bulky in size.

In addition, the reflector 24 has no way other than being accommodated in the space rearwardly of the plane of the joint 23. In other words, the space where the reflector 24 can be placed is limited and, therefore, the width L of the reflecting surface 24a of the reflector 24 as measured in a direction substantially perpendicular to the longitudinal sense of the vehicle body structure cannot be increased, resulting in difficulty in increasing the efficiency of reflecting and collecting rays of light emitted from the lamp 25.

SUMMARY OF THE INVENTION

In view of the foregoing problems and inconveniences inherent in the conventional direction indicator discussed above, the present invention is intended to provide an improved direction indicator of a compact design effective to secure brightness and visibility during the blinking operation of the direction indicator.

In order to accomplish the foregoing object, the present invention provides a direction indicator for vehicles, which includes an indicator body adapted to be mounted on a vehicle body structure, a lens member mounted on the indicator body, and a light emitter and a reflector positioned inwardly of the lens member, the reflector reflecting an illuminating light, emitted from the light emitter, towards an intended area. A plane of joint between the indicator body and the lens member is inclined relative to a widthwise direction of the vehicle body structure, and the lens member has a laterally outer vertex portion protruding laterally outwardly from a position of a laterally outer vertex portion of the indicator body.

According to the present invention, the plane of joint between the indicator body and the lens member is inclined relative to the widthwise direction of the vehicle body structure and the lens member has a laterally outer vertex portion protruding laterally outwardly from the position of a laterally outer vertex portion of the indicator body. Accordingly, in the front direction indicator the lens member has a lens surface protruding in a direction forwardly of the vehicle body structure, a direction diagonally forwardly of the vehicle body structure and a direction laterally outwardly of the vehicle body structure and, therefore, the front direction indicator can be visible from a direction forwardly of the vehicle body structure, a direction diagonally forwardly of the vehicle body structure and a direction laterally and rearwards of the vehicle body structure. Similarily, the rear direction indicator can be visible from a direction rearwardly of the vehicle body structure, a direction diagonally rearwardly of the vehicle body structure and a direction laterally and forwardly of the vehicle body structure.

In a preferred embodiment of the present invention, the light emitter may have a light emitting portion positioned within an inner space of the lens member. The inner space of the lens member referred to above is defined in the lens member and delimited by an inner surface of the lens member and the imaginary plane passing in touch with a peripheral edge which defines a joint edge of the lens member engageable with the indicator body. This disposition of the light emitter is particularly advantageous in that since a light emitting portion of the light emitter can be positioned within a space defined on one side adjacent the lens member, rather than the plane of joint between the indicator body and the lens member, the light emitter can be visible directly from top and bottom. Therefore, rays of light emanating from the light emitter can be projected upwardly and downwardly without being disturbed by the indicator body. In particular, upward illumination allows a truck driver, seated in a cabin seat positioned relatively high above the road surface, to look at the direction indicator.

In another preferred embodiment of the present invention, the reflector may extend from one end of the plane of joint between the indicator body and the lens member to a portion adjacent the laterally outer vertex portion of the lens member, which outer vertex portion is positioned adjacent the other end of such joint edges. According to this structural feature, by allowing the reflector to extend to the position adjacent the laterally outer vertex portion of the lens member as described above, the reflector can have an increased size. This leads to increase of the area of the reflecting surface of the reflector as compared with that in the conventional direction indicator, with the consequence that the efficiency of collecting rays of light from the light emitter can be increased to increase the illuminance.

In a further preferred embodiment of the present invention, the light emitter may be a lamp bulb including a light emitting portion having a filament built therein, in which case the lamp bulb may be supported by the indicator body with a longitudinal axis of the lamp bulb inclined relative to a longitudinal direction of the vehicle body structure. According to this structural feature, when the lamp bulb generally having a substantial length in a direction along the longitudinal axis thereof is supported by the indicator body with the longitudinal axis thereof inclined relative to the longitudinal direction of the vehicle body, the length of the lamp as measured in a direction conforming to the longitudinal sense of the vehicle body structure can be reduced, allowing the direction indicator as a whole to have a reduced size in a direction conforming to the longitudinal sense of the vehicle body. Accordingly, as compared with the conventional direction indicator, the direction indicator of the present invention can be manufactured compact in size and lightweight.

The angle of inclination of the plane of joint between the indicator body and the lens member is preferably within the range of 35 to 55°.

The reflector may be bonded to the lens member, so that, during the repair and/or servicing of the light emitter, the assembly of the reflector integrated together with the lens member can be removed from the indicator body to thereby facilitate the repair and/or servicing work.

The light emitter may comprise a light emitting diode, which brings about an electric power saving feature.

BRIEF DESCRIPTION OF THE DRAWINGS

In any event, the present invention will become more clearly understood from the following description of a preferred embodiment thereof, when taken in conjunction with the accompanying drawings. However, the embodiment and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 7 is a transverse sectional view of the conventional direction indicator shown in FIG. 6.

DETAILED DESCRIPTION OF THE EMBODIMENT

Figure 1:
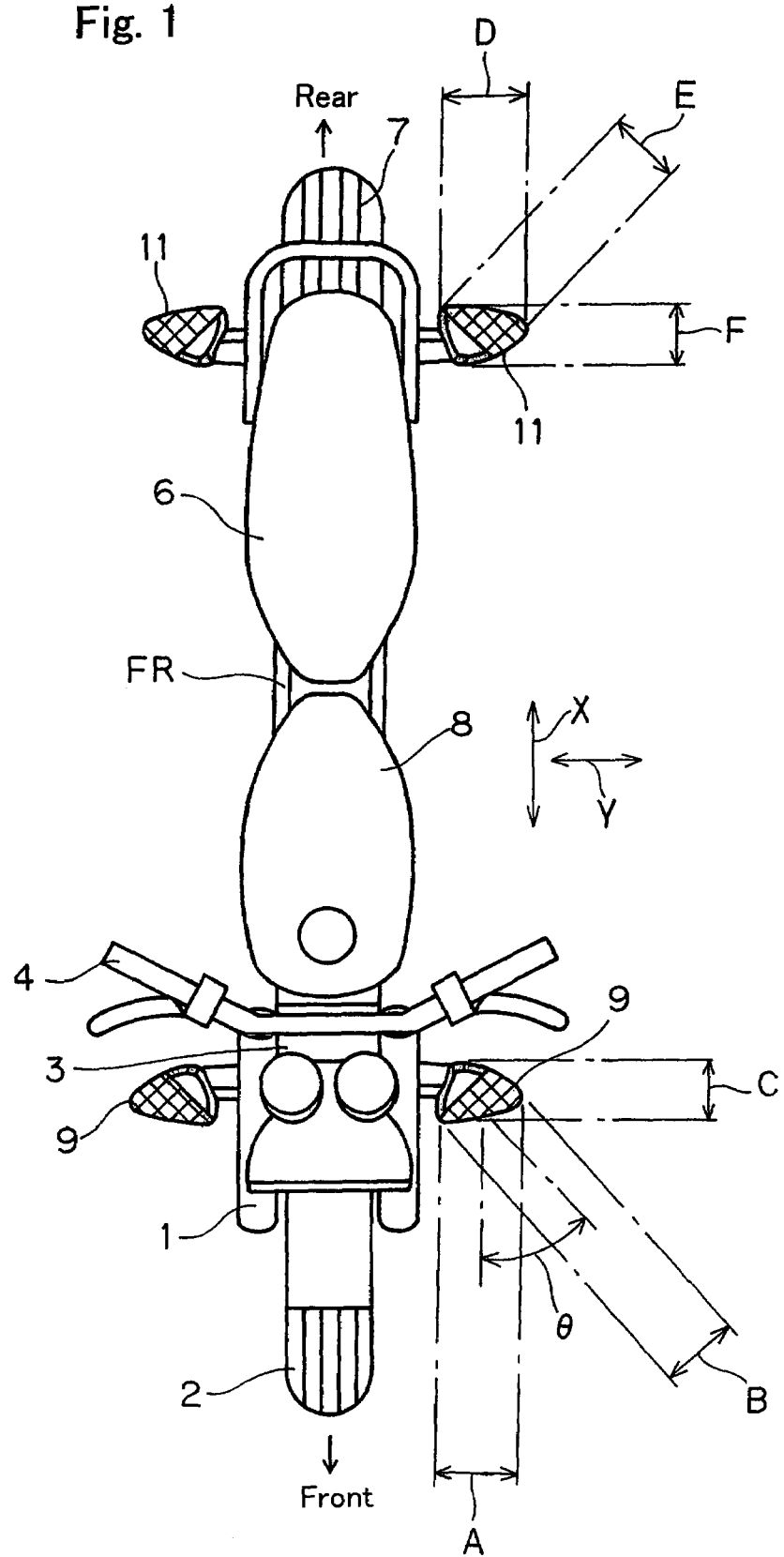
FIG. 1 is a schematic top plan view of a motorcycle equipped with front and rear direction indicators designed according to a preferred embodiment of the present invention.

Hereinafter, a preferred embodiment of the present invention will be described with reference to the accompanying drawings, particularly to FIGS. 1 to 5. FIG. 1 illustrates, in a schematic top plan representation, an automotive vehicle, for example, a motorcycle equipped with front and rear pairs of left and right direction indicators designed according to the preferred embodiment of the present invention. Specifically, the motorcycle shown therein includes a motorcycle frame structure FR connected at a front end thereof with a front fork 1 with a front wheel 2 rotatably carried at a lower end thereof. A handlebar 4 is mounted on an upper bracket 3 that is rigidly connected with an upper end of the front fork 1, and a seat assembly 6 is mounted on a rear end portion of the motorcycle frame structure FR. A rear drive wheel 7 is rotatably supported by a swingarm (not shown) pivotally connected with a portion of the motorcycle frame structure FR at a location rearwardly downwardly of the frame structure FR. A fuel tank 8 accommodating a quantity of fuel is mounted on the frame structure FR at a location generally intermediate between the handlebar 4 and the seat assembly 6.

A front pair of left and right direction indicators 9 each being activated to blink so as to provide a visible indication of the direction in which the motorcycle turns leftwards or rightwards are carried by the front fork 1. On the other hand, a rear pair of left and right direction indicators 11 each being activated in unison with the associated front direction indicators 9 to blink so as to provide a similar visible indication of the direction are secured to a rear portion of the frame structure FR so as to protrude laterally outwardly therefrom in respective directions opposite to each other.

Figure 2:
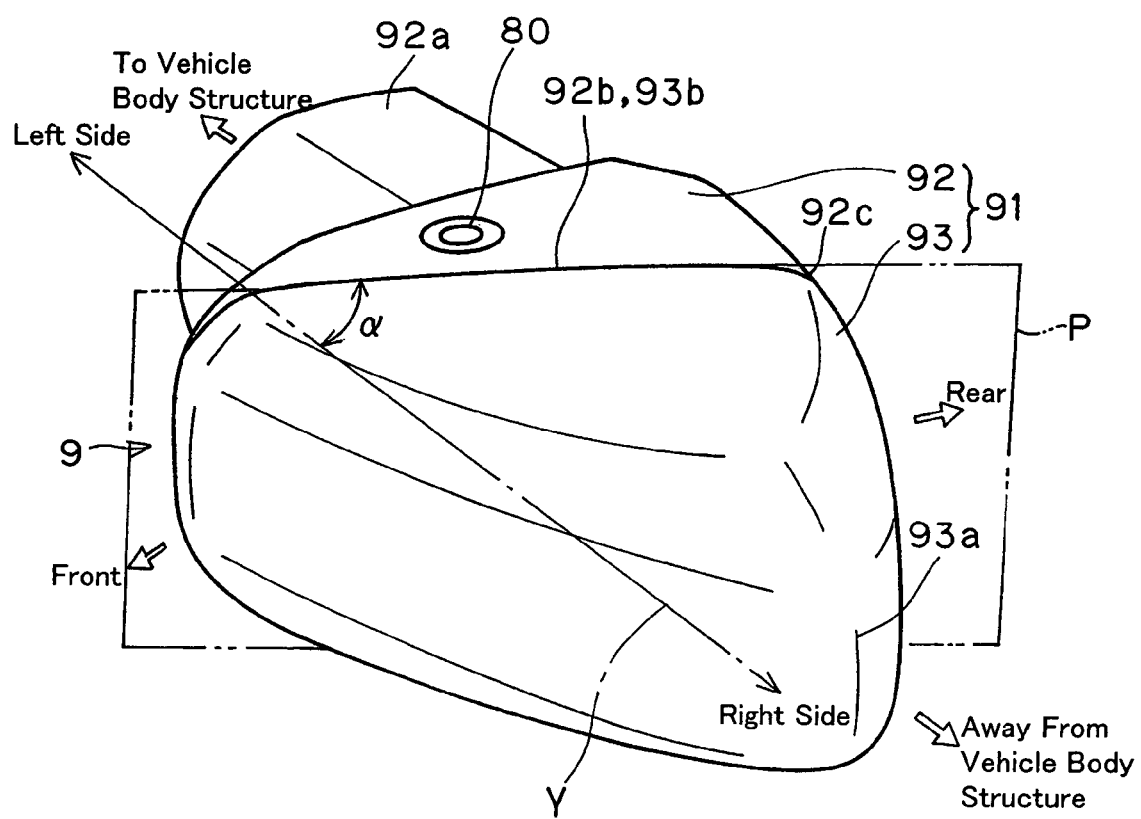
FIG. 2 is a perspective view, on an enlarged scale, showing one of the direction indicators shown in FIG. 1.

All of the direction indicators 9 and 11 are of a substantially identical to each other and, therefore, reference will be made to only one of them, for example, the front left direction indicator 9 for a better understanding of the present invention. FIG. 2 illustrates, on an enlarged scale in a perspective representation, the front left direction indicator 9 fixedly mounted on a left portion of the front fork 1 with respect to the direction of forward run of the motorcycle.

The front left direction indicator 9 shown in FIG. 2 includes an indicator body 92 positioned laterally outwardly of the frame structure FR and having an arm 92a secured to a left portion of the front fork 1. The indicator body 92 represents a generally triangular cup-shaped configuration, when viewed from top as shown in FIG. 1, having an opening delimited by a generally rectangular joint edge 92b shown in FIG. 2. The opening of the indicator body 92 opens in a direction laterally outwardly and forwardly with respect to the direction of forward run of the motorcycle. A lens member 93 having a joint edge 93b that is mated with the joint edge 92b of the indicator body 92 represents a generally triangular cup-shaped configuration, when viewed from top as shown in FIG. 1, covers the opening of the indicator body 92. The joint edges 92b and 93b together form a plane of joint.

The plane of the joint between the indicator body 92 and the lens member 93 formed by the mating joint edges 92b and 93b lies at an angle α, which is preferably within the range of 35 to 55° and, more preferably, within the range of 40 to 50° relative to the widthwise direction of the frame structure FR (i.e., the transverse axis extending perpendicular to the longitudinal sense of the frame structure FR), although so far as shown about 45° is chosen for the angle α.

An indicator housing 91 defined by the indicator body 92 and the lens member 93 has corner areas, all of which are rounded to provide an appealing appearance. A laterally outer vertex portion 93a of the lens member 92, which is a laterally outermost end thereof, is positioned laterally outwardly of a laterally outer vertex portion 92c of the indicator body 92.

Figure 3:
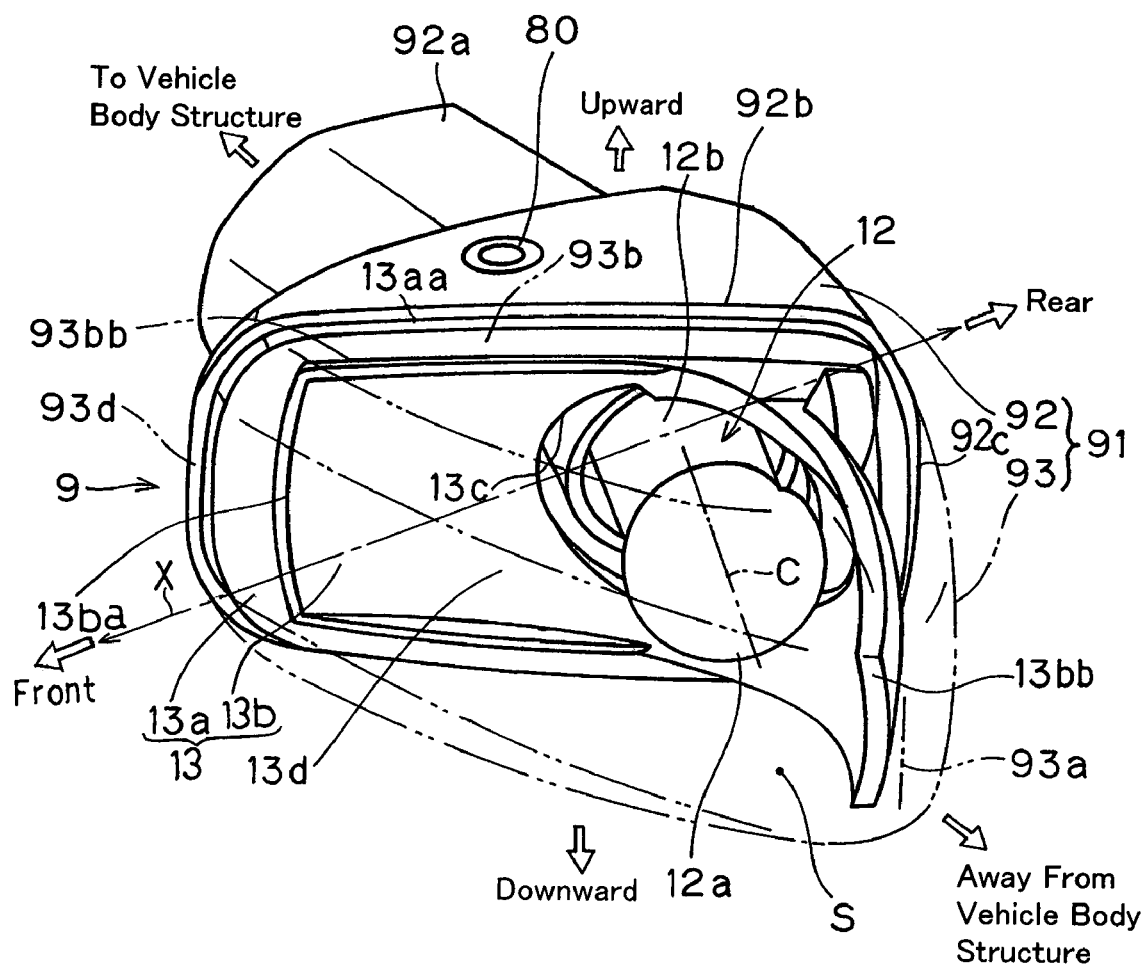
FIG. 3 is a view similar to FIG. 2, showing the details of the interior of the direction indicator.

Referring to FIG. 3 showing the details of the interior of the direction indicator 9, a lamp bulb 12 of a type having a light emitting portion 12a, with a filament built therein, and a stem portion 12b is housed inside the direction indicator 9.

With the lamp bulb 12 housed inside the direction indicator 9, the light emitting portion 12a is positioned within an inner space S defined in the lens member 93, while the stem portion 12b is supported by the indicator body 92 with its longitudinal axis C inclined outwardly relative to the longitudinal sense of the frame structure FR and generally towards a vertex of the lens member 92. This disposition of the lamp bulb 12 is particularly advantageous in that the space occupied by the lamp bulb 12 in a direction X parallel to the longitudinal sense of the motorcycle frame structure FR can be reduced, with the lamp bulb 12 neatly and snugly accommodated within the indicator housing 91. The inner space S of the lens member 93 referred to above is represented by a space delimited by an imaginary plane P lying in touch with the joint edge 93b of the lens member 93, and an inner surface 93f of the lens member 93 as clearly shown in FIG. 5. The lens member 92 has an approximately inverted "j" cross-sectional configuration from a plan view shown in FIG. 5.

Figure 4:
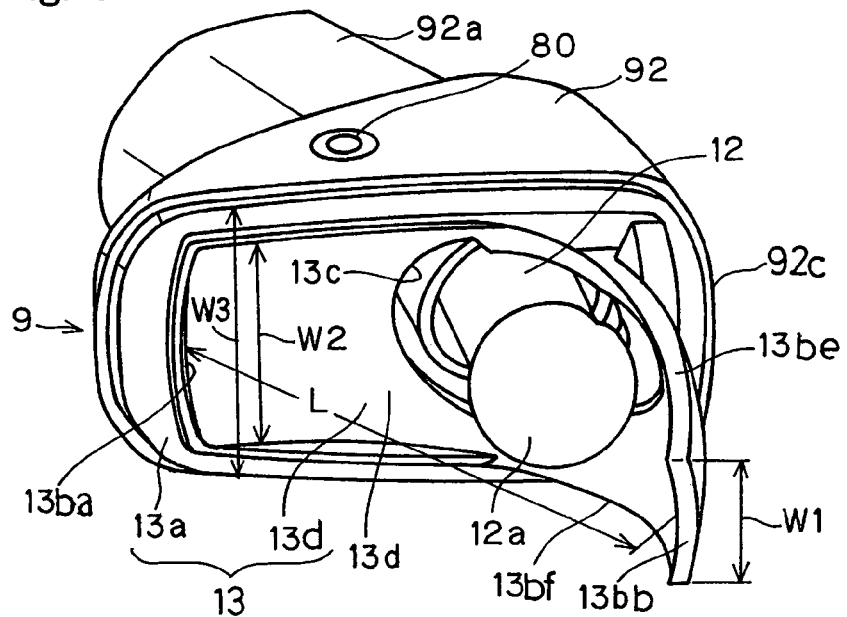
FIG. 4 is a view similar to FIG. 2, showing the direction indicator with a lens member removed.

Within the indicator housing 91 shown in FIG. 3, a reflector 13 is disposed for reflecting rays of light from the lamp bulb 12 towards a predetermined range. The reflector 13 is of a structure including a generally rectangular base 13a and a mirror 13b integrally formed with the base 13a. The base 13a is inseparably fixed to the lens member 93. Specifically, the base 13a has a peripheral edge 13aa fusion bonded with an inner peripheral side portion of the joint edge 93b of the lens member 93 by means of a high frequency heating technique to thereby integrate the reflector 13 together with the lens member 93. The mirror 13b extends from a base portion 13ba adjacent an inner end 93d of the joint edge 93b to the opposite end thereof with a free end 13bb reaching the lateral outer vertex portion 93a of the lens member 93. The reflector 13 is formed with an insertion hole 13c through which the lamp bulb 12 is inserted. The mirror 13b ranging from the base portion 13ba adjacent a front end of the base 13a to the free end 13bb located rearward of the base portion 13ba is so shaped and so curved as to recess rearwards and inclined with respect to the widthwise direction of the frame structure FR. Accordingly, as compared with the reflector employed in the conventional direction indicator, the width L of the mirror 13b of the reflector 13 between the front end 13ba and the free end 13bb is substantially increased as shown in FIG. 4 and, thus, the mirror 13b or the reflector 13 employed in the present invention is large in size. The mirror 13b has a height progressively decreasing from the base portion 13ba including the front end towards the free end 13bb thereof, such that the height W1 of the free end 13bb of the reflector 13 is relatively small as compared with the height W2 of the base portion 13ba thereof. Accordingly, the height W1 of the free end 13bb of the reflector 13 is rendered smaller than the height W3 of the base 13a which is larger than the height W2 of the base portion 13ba.

Figure 5:
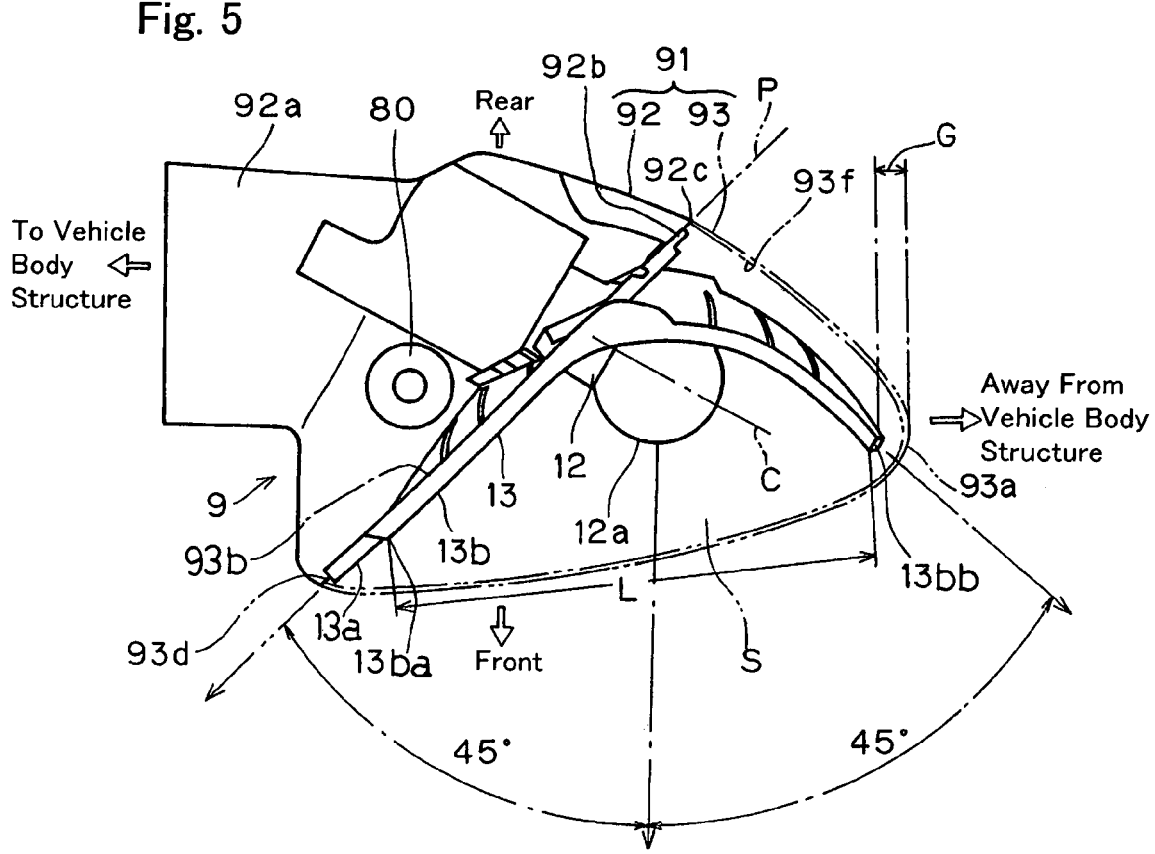
FIG. 5 is a top plan view of the direction indicator shown in FIG. 2.
Figure 6:
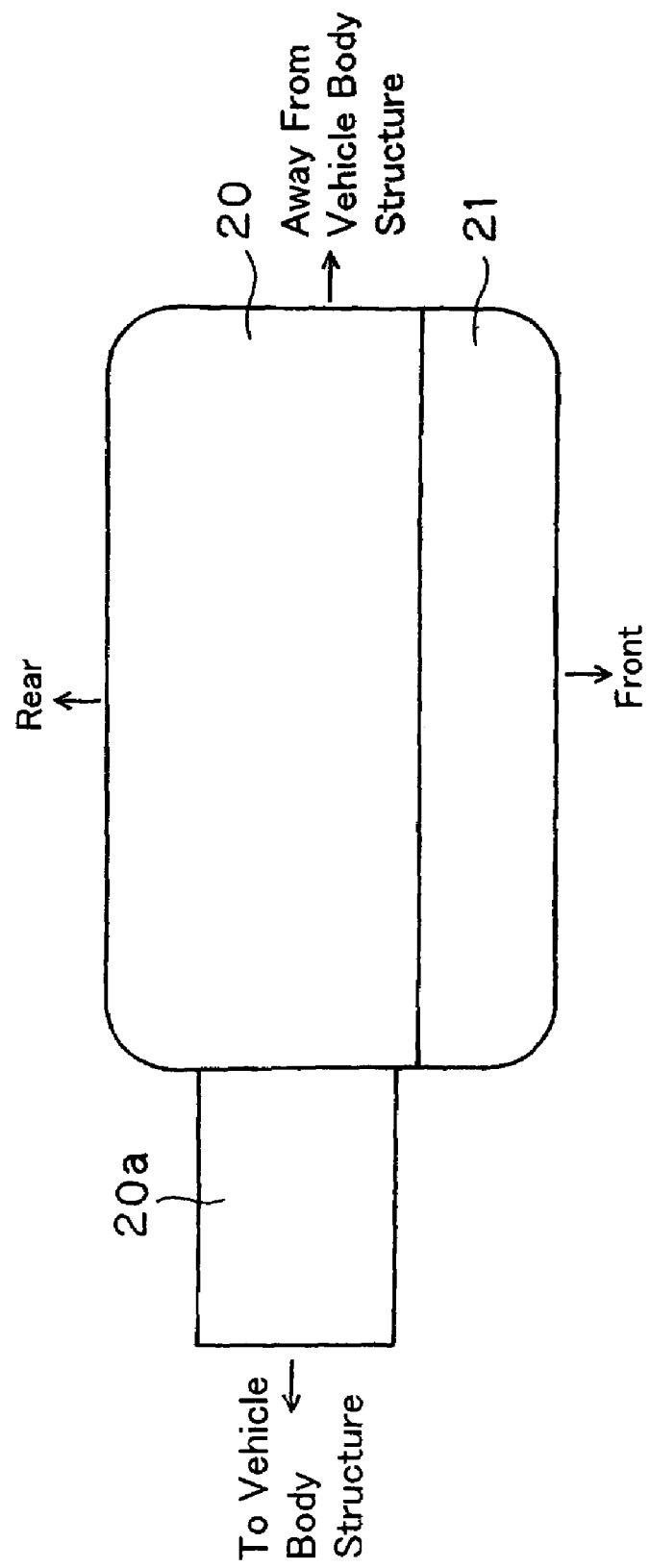
FIG. 6 is a top plan view of the conventional direction indicator.

The reflector 13 is made of a synthetic resin and has a reflecting surface 13d formed in an area thereof ranging from the base portion 13ba of the mirror 13b adjacent the inner end 93d of the lens member 93, as shown in FIG. 3, to the free end 13bb. This reflecting surface 13d of the reflector 13 is mirror finished by means of a metal vapor deposition process. As described above, the reflector 13 integrated together with the lens member 93 by means of the fusion bonding is supported by the indicator body 92 by means of a plurality of bolts 80 that are inserted externally through the indicator body 92 and threaded into corresponding screw holes (not shown) defined in the base 13a of the reflector 13. The reflector 13 has an approximately "j" cross-sectional configuration from a plan view, that is looking down from the top, with base portion 13ba or base end at the plane of the joint at a top of the "j" and a cantilevered extended free end 13bb having a smaller height than a height of the base end at a bottom of the "j" as shown in FIG. 5.

With the direction indicator being so constructed as hereinabove described, front and rear left direction indicators 9 and 11, for example, blink when the motorcycle shown in FIG. 1 turns leftwards. At this time, rays of light emerging from the front left direction indicator 9 are projected not only in a direction A forwardly of the motorcycle as shown in FIG. 1, but also in a direction B diagonally forwardly of the motorcycle and a direction C laterally of the motorcycle, since the lens member 93 shown in FIG. 2 protrudes a considerable distance diagonally forwardly and laterally of the motorcycle. Accordingly, the angle θ defined between the forward direction A and the diagonally forward direction B satisfies the statutory requirement of 45°.

Also, since the reflector 13 shown in FIG. 3 is of a relatively large size extending a substantial distance from the inner end 93d of the lens member 93 to the laterally outer vertex portion 93a of the lens member 93, the reflecting surface 13d has an increased surface area enough to increase the light collecting efficiency. In addition, since as shown in FIG. 4, the height W1 of the free end 13bb of the mirror 13b of the reflector 13 is reduced to a value smaller than the height W2 of the base portion 13ba of the mirror 13b or the height W3 of the base 13a, the rays of light can be cast not only in a direction laterally, but also in a direction rearwardly from upper and lower side edges 13be and 13bf of the mirror 13b, allowing the direction indicator 9 to be viewed not only from laterally, but also from rear. Yet, since as shown in FIG. 5 the rays of light can also be emitted in a rearward direction G through a gap between the free end 13bb of the mirror 13b and the laterally outer vertex portion 93a of the lens member 93, the direction indicator 9 can be viewed from rear.

Similarly, with respect to the rear left direction indicator 11 secured to the rear portion of the motorcycle frame structure FR as shown in FIG. 1, since the lens member of this rear direction indicator 11 is oriented rearwardly of the motorcycle frame structure FR, not only a region D rearwardly of the motorcycle, but also a region E diagonally rearwardly of the motorcycle and a region F laterally of the motorcycle can be illuminated, resulting in increase of the illuminating angle. Accordingly, the rear direction indicator 11 can be viewed not only from the rear region D, but also from the diagonally rearward and lateral regions E and F.

In addition, considering that the light emitting portion 12a of the lamp bulb 12 shown in FIG. 5 is positioned within the inner space S as hereinbefore described, regions upwardly and downwardly of the front position indicator 9 can also be illuminated. Therefore, a truck driver seated in a cabin seat positioned relatively high above the road surface can view the direction indicator 9 being operated satisfactorily.

Yet, when it comes to the repair and/or servicing of, for example, the lamp bulb 12, the assembly of the reflector 13 integrated together with the lens member 93 by the use of the fusion bonding technique can readily be removed from the indicator body 92, thus facilitating the lamp bulb 12, carried by the indicator body 92, to be replaced with a fresh lamp.

Considering that the lamp bulb 12, which is generally long in a direction along the longitudinal axis C thereof is supported by the indicator body 92 in a diagonally oriented fashion, the length of the lamp bulb 12 in a direction parallel to the longitudinal sense of the motorcycle can advantageously be reduced as compared with the conventional case in which the lamp is supported with its longitudinal axis oriented parallel to the longitudinal sense of the motorcycle. Accordingly, the indicator housing 91 as a whole can have a reduced size, bringing in the compact direction indicators 9 and 11.

Although the present invention has been fully described in connection with the preferred embodiment thereof with reference to the accompanying drawings which are used only for the purpose of illustration, those skilled in the art will readily conceive numerous changes and modifications within the framework of obviousness upon the reading of the specification herein presented of the present invention. By way of example, although the direction indicators of the present invention have been shown and described as mounted on the motorcycle and by so doing, it appears that the present invention can bring about rather feasible effects, one or more of the direction indicators of the present invention can be equally mounted on any other vehicles such as, for example, motor scooters, tricycle motor bogies and four-wheeled motor bogies.

Also, the lamp bulb 12 shown in FIG. 3 may not be always limited to an incandescent lamp, but may be employed in the form of one or an array of light emitting diodes, which are known to have an electric power saving effect. The use of the light emitting diode or the array of the light emitting diodes in place of the incandescent lamp is particularly advantageous in that since the light emitting diode is smaller in size than the incandescent lamp, the direction indicator can be made further in compact.

Accordingly, such changes and modifications are, unless they depart from the scope of the present invention as delivered from the claims annexed hereto, to be construed as included therein.

What is claimed is:

1. A direction indicator for vehicles, which comprises:
an indicator body adapted to be mounted on a vehicle body structure;
a lens member mounted on the indicator body; and
a light emitter and a reflector positioned inwardly of the lens member, the reflector reflecting an illuminating light, emitted from the light emitter, towards an intended area;
wherein a plane of joint between the indicator body and the lens member is inclined relative to a widthwise direction of the vehicle body structure,
wherein the lens member has a laterally outer vertex portion protruding laterally outwardly from a position of a laterally outer vertex portion of the indicator body, and
wherein the reflector includes a mirror extending from one end of the plane of joint between the indicator body and the lens member to the other end thereof and to a portion adjacent the laterally outer vertex portion of the lens member and curved so as to recess rearwardly with respect to the light emitter, wherein the mirror has an approximately "j" cross-sectional configuration, from a plan view with a base end at the plane of the joint at a top of the "j" and an extended free end of a smaller height than a height of the base end at a bottom of the "j."

2. The direction indicator as claimed in claim 1, wherein the light emitter has a light emitting portion positioned within an inner space of the lens member, and visible as viewed in a vertical direction.

3. The direction indicator as claimed in claim 2, wherein the light emitter is a lamp bulb including a light emitting bulb having a filament built therein and is supported by the indicator body with a longitudinal axis of the lamp inclined relative to a longitudinal direction of the vehicle body structure.

4. The direction indicator as claimed in claim 1, wherein the reflector is bonded to the lens member.

5. The direction indicator as claimed in claim 4, wherein the reflector is fusion bonded to the lens member.

6. The direction indicator as claimed in claim 1, wherein the light emitter comprises a light emitting diode.

7. A direction indicator for motorcycles comprising:
an indicator body unit adapted to be mounted to and offset from a motorcycle body structure including an indicator body and a mounting arm suspending the indicator body at one end and configured to mount to the motorcycle body structure at the other end;
a translucent lens member having an approximately inverted "j" cross-sectional configuration, from a plan view, being joined to the indicator body;
a reflector mounted in the indicator body and having an approximately "j" cross-sectional configuration, from a plan view, with a base end adjacent the indicator body and an extended free end cantilevered into the translucent lens member, the extended free end having a smaller height than a height of the base end, the extended free end being positioned adjacent a vertex of the translucent lens member; and
a light emitter with a mounting axis directed towards the vertex of the translucent lens member,
wherein light emitted from the light emitter is emitted through the lens member beyond the extended free end of the reflector in a direction away from light reflected from the reflector.

8. The direction indicator for motorcycles as claimed in claim 7 wherein the indicator body and the translucent lens member are plastic and fused together to form an approximately triangular cross-sectional configuration.

9. A direction indicator for vehicles, which comprises:
an indicator body adapted to be mounted on a vehicle body structure;
a lens member mounted on the indicator body; and
a light emitter and a reflector positioned inwardly of the lens member, the reflector reflecting an illuminating light, emitted from the light emitter, towards an intended area;
wherein a plane of joint between the indicator body and the lens member is inclined relative to a widthwise direction of the vehicle body structure,
wherein the lens member has a laterally outer vertex portion protruding laterally outwardly from a position of a laterally outer vertex portion of the indicator body, and
wherein the reflector includes a mirror extending from one end of the plane of joint between the indicator body and the lens member to the other end thereof and to a portion adjacent the laterally outer vertex portion of the lens member and curved so as to recess rearwardly with respect to the light emitter, wherein the lens member has an approximately inverted "j" cross-sectional configuration, from a plan view with a vertex of the lens member positioned adjacent an extended free end of the mirror wherein light from the light emitter is emitted through the lens member beyond the extended free end of the mirror in a direction away from the reflected light from the mirror.

10. The direction indicator as claimed in claim 9 wherein the indicator body and the lens member are plastic and are fused together along the plane of the joint to form an approximately triangular cross-sectional configuration.

11. The direction indicator as claimed in claim 9, wherein the plane of joint between the indicator body and the lens member is inclined at an angle within the range of 35 to 55°.

12. The direction indicator as claimed in claim 9, wherein the light emitter has a light emitting portion positioned within an inner space of the lens member, and visible as viewed in a vertical direction.

13. The direction indicator as claimed in claim 9, wherein the height of the extended free end of the mirror is smaller than the height of a base end thereof.

14. The direction indicator as claimed in claim 9, wherein the light emitter is a lamp bulb including a light emitting bulb having a filament built therein and is supported by the indicator body with a longitudinal axis of the lamp inclined relative to a longitudinal direction of the vehicle body structure.

15. The direction indicator as claimed in claim 9, wherein the reflector is bonded to the lens member.

16. The direction indicator as claimed in claim 15, wherein the reflector is fusion bonded to the lens member.

17. The direction indicator as claimed in claim 9, wherein the light emitter comprises a light emitting diode.

\* \* \* \* \*